United States Patent [19]

Kadela

[11] Patent Number: 4,981,188
[45] Date of Patent: Jan. 1, 1991

[54] ALL TERRAIN OFF ROAD VEHICLE

[75] Inventor: Bronislaw Kadela, Edmonton, Alberta, Canada

[73] Assignee: K. S. M. Innovations, Inc., Edmonton, Canada

[21] Appl. No.: 305,752

[22] Filed: Feb. 3, 1989

[30] Foreign Application Priority Data

Feb. 9, 1988 [CA] Canada .................................. 558525

[51] Int. Cl.⁵ ............................................ B62D 55/07
[52] U.S. Cl. ................................ 180/9.25; 180/9.62; 305/35 EB
[58] Field of Search ...................... 180/9.1, 9.21, 9.22, 180/9.25, 9.26, 9.3, 9.54, 9.62, 210, 227; 305/35 R, 35 EB, 16, 17, 18; 114/61, 123, 270

[56] References Cited

U.S. PATENT DOCUMENTS

| | | | |
|---|---|---|---|
| 1,323,704 | 12/1919 | Lissman | 305/18 |
| 2,702,088 | 2/1955 | Klimek | 180/9.25 |
| 3,063,401 | 11/1962 | Patee | 180/9.1 |
| 3,221,830 | 12/1965 | Walsh | 180/9.25 |
| 3,265,026 | 8/1966 | Hamilton | 114/123 |
| 3,537,417 | 11/1970 | Beckner | 114/123 |
| 3,582,154 | 6/1971 | Russ | 305/35 EB |
| 3,883,191 | 5/1975 | Chaumont | 180/9.1 |
| 3,950,038 | 4/1976 | Wood | 180/9.1 |
| 4,562,785 | 1/1986 | Priam-Doizi | 114/123 |
| 4,789,037 | 12/1988 | Kneebone | 180/9.1 |

Primary Examiner—Charles A. Marmor
Assistant Examiner—Mitchell Bompey
Attorney, Agent, or Firm—Berman, Aisenberg & Platt

[57] ABSTRACT

An all weather, all terrain, amphibious tracked vehicle for riding and operation by one or a small number of persons. The vehicle includes a main frame structure made of strong but light weight plastic or metal and having the general shape of an elongated enclosed box. The top surface of the structure is generally flat and the bottom surface in the lengthwise dimension has a convex shape. Two track guides parallel to each other are built into or on and encircles the main frame in the lengthwise dimension adjacent to the outer edges. A continuous rubber belt which has a generally flat inner surface and in which a series of belt carriers are fixed. The carriers have bearings adapted to travel in the two track guides, such that the belt can run in guided fashion around the main frame in the lengthwise direction. A guiding sprocket wheel is mounted transversely on an axle at the front of and exterior to the main frame and is positioned such that the teeth of the sprocket wheel engage openings in the belt carriers. An outer body made of plastic or metal is rigidly mounted on the main frame over the upper portion of the belt and incorporates fixed handlebars at the front, an operator's seat, and a fuel tank and leg sliders are mounted on either side of the main frame.

7 Claims, 6 Drawing Sheets

ALL TERRAIN OFF ROAD VEHICLE

BACKGROUND OF THE INVENTION

This invention relates to an all weather, all terrain, amphibious, motorized, tracked vehicle for riding and operation by one or a small number of persons.

Up until the present time vehicles of this general type for use over rough terrain have required some form of transformation from summer to winter conditions or to be usable only on bare ground or only on snow. Furthermore, such vehicles, if at all amphibious have not been provided with means to climb steep banks such as may be encountered while getting up from a lake or river. Furthermore such vehicles have been known to have maneuverability problems under certain conditions such as, for example, turning around on a narrow path. Some such vehicles because of their weight or size or both, have usually required either a separate trailer or a special vehicle such as a truck to transport them over highways. Some such vehicles have had stability problems in certain rough terrain conditions.

Known prior patents describing vehicles of a somewhat similar nature are as follows:

U.S. Pat. No. 3,157,913 issued Nov. 24, 1964 to W. H. Hubert

U.S. Pat. No. 3,521,717 issued July 23, 1970 to R. C. Coons

U.S. Pat. No. 3,638,746 issued Feb. 1, 1972 to L. A. Gostowski

U.S. Pat. No. 3,912,031 issued Oct. 14, 1975 to L. Goulet

It will be seen that none of these patents describe rough terrain vehicles that have much relationship to that to be described in the present application. They are concerned with motor cycle or scooter vehicles that require conversion or adaptation to make them into snowmobile or rough terrain type devices.

SUMMARY OF THE INVENTION

It is an object of the invention to provide a light weight, single track, motorized vehicle that is amphibious, unsinkable, all terrain and all season, safe and stable and having no need of transformations or additions to adapt it to different weather or terrain conditions.

This and other objects of the invention are achieved by an all weather, all terrain, amphibious, tracked vehicle for riding and operation by one or a small number of persons comprising; a main frame structure made of strong but light weight plastic or metal and having the general shape of an elongated enclosed box, the top surface of the structure being generally flat and the bottom surface in the lengthwise dimension having a convex shape, two track guides parallel to each other built into or on and encircling the main frame in the lengthwise dimension adjacent the outer edges, a continuous rubber belt having a generally flat inner surface in which a series of belt carriers are fixed, the carriers having bearings adapted to travel in the two track guides such that the track belt can run in guided fashion around the main frame in the lengthwise direction, said belt having an outer portion in the form of a continuous series of vane-like sections having a generally semi-circular cross-section with teeth or studs formed along the outer edge, a driving sprocket wheel mounted transversely on an axle at the rear of and exterior to the main frame and positioned such that the teeth of the sprocket wheel engage openings in the belt carriers, a guiding sprocket wheel mounted transversely on an axle at the front of and exterior to the main frame and positioned such that the teeth of the sprocket wheel engage openings in the belt carriers, a power source, transmission, clutch and brake means mounted inside the main frame and adapted to drive the rear axle on which the driving sprocket wheel is mounted via water-tight shaft bearings, an outer body made of plastic or metal rigidly mounted on the main frame over the upper portion of the belt and incorporating fixed handle bars at the front, an operator's seat, and a fuel tank, operation and control and fuel delivery means running from the outer body to the driving mechanisms in the main frame, and power source ventilating and cooling means inside the main frame and adapted to bring fresh air in and exhaust air out through ducts to the exterior. In the preferred version of the vehicle there are provided leg sliders in the form of elongated pontoon-like structures mounted on each side of the main frame on rocking arms such that they can move up, down, and sideways but always remaining parallel to the main frame and outer body. The leg sliders preferably have a double-walled light construction and opening in their upper side for the feet of the vehicle operator.

DESCRIPTION OF THE PREFERRED EMBODIMENT

Figure 1:
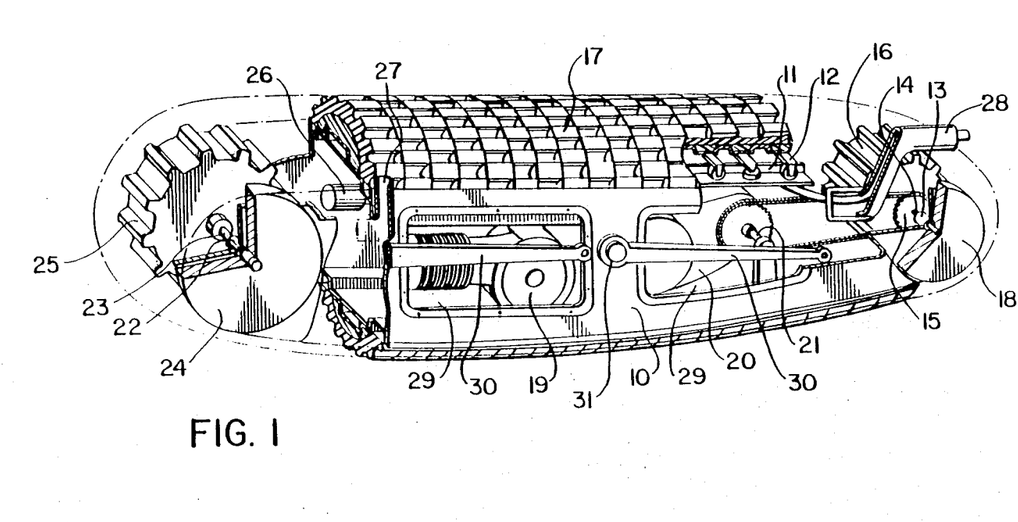
FIG. 1 is a side, partially broken view of the main frame with track.

Referring to the drawings, FIG. 1 shows the main frame and belt drive construction. The main frame 10 is made of hard but light plastic or metal and has the general shape of an elongated quadratic prism closed in from all sides forming a light weight water tight box. The bottom part of this box has a convex shape in the lengthwise direction. The frame 10 has two track guides 11 built into or on it which are parallel to each other and run along the length both top and bottom and near the outer edges of the frame and are designed such as to guide the track carrier mechanism 12. Inside and at the back of the main frame are the housings for the roller bearings 13 which carry the rear axle 14 on which are mounted the sprocket wheels 15 which drive the rear axle. On this axle is also positioned a large sprocket wheel 16 preferably made of plastic material for driving the track carrier mechanisms 12 carrying the track 17 and two bogie wheels 18 placed on the left and right of the large sprocket wheel. The engine 19 which is preferably a one-cylinder, four stroke gasoline engine, air cooled and with an electric starter and centrifugal clutch is positioned in the middle of the main frame and drives the rear axle through transmission 20 mounted on transmission shaft 21. Brake drums and shoes are also mounted on this transmission shaft. The engine drive is transmitted by chain then to the two sprocket wheels 15 on rear axle 13.

As in the rear, housings for the roller bearings 22 are located inside the front of the main frame and carry front axle 23. The front axle in the bearing housings is designed to be adjustably movable for tightening the track belt 17. On the front axle, two bogie wheels 24 are mounted with a large sprocket wheel 25 whose teeth engage slots in the track carrier mechanisms to guide the belt and keep it centered. The four bogie wheels and the large sprocket wheels are preferably made of plastic material and filled with polyurethane foam to make them light, floatable, and of strong construction.

An electric ventilator 26 is positioned inside the main frame for interior cooling and removal of engine exhaust gases by way of air exchange through two air intake canals 27 in the front and two exhaust canals 28 in the rear. On each side of the main frame two large water tight plates (not shown) cover openings 29 on the sides of the main frame. These openings provide access to the engine and inside mechanisms. The main frame is finished on the inside with glass fibre, resistant to high temperatures. Two rocking arms 30 are mounted on each side of the main frame on bearings 31. These will be described in more detail below.

Figure 2:
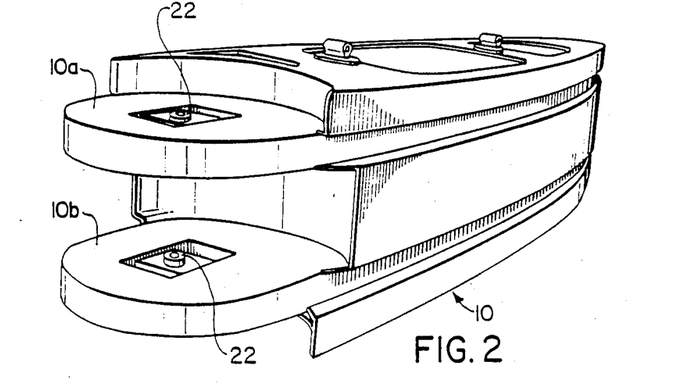
FIGS. 2 and 3 show the construction of the front and rear portions of the main frame arranged to carry the driving and guiding sprocket and bogie wheels.
Figure 3:
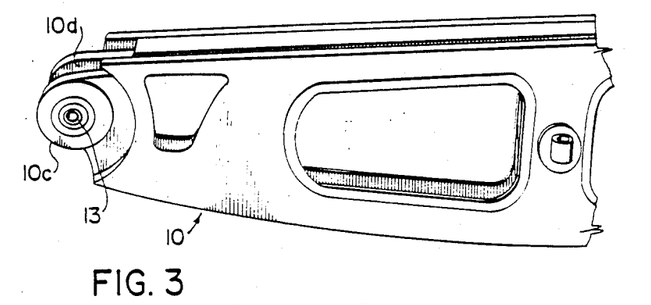
Figure 4:
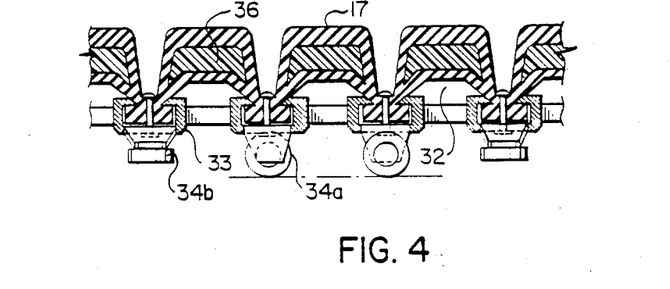
FIG. 4 is a lengthwise cross-section view of the single track mounted on the track carrier mechanisms.
Figure 5:
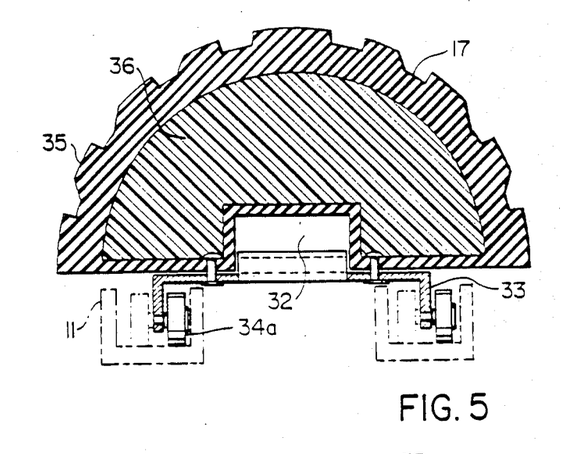
FIG. 5 is a transverse cross-section view of the track mounted on the track carriers mechanisms.

FIGS. 2 and 3 illustrate the construction and arrangement of the engine drive and driving and guiding sprocket wheels referred to in FIG. 1 in more detail. The front end of the main frame 10 is formed as shown in FIG. 2. The large sprocket wheel 25 (of FIG. 1) is mounted on an axle positioned in bearings 22 between extensions 10a and 10b. Bogie wheels 24 (of FIG. 1) are mounted outwardly of the two extensions on the same axle and serve to carry and guide the track belt around the front end. The rear end of the main frame 10 is formed in a similar fashion with two extensions 10c and 10d having bearings 13 for carrying the driving sprocket wheel and the two outwardly mounted bogie wheels. The chain drive and gear wheels driving the axle are positioned in cavities formed inside the extensions 10c and 10d and the bearings 22 are of a sealed type so that the inside of the main frame is water tight.

Figure 6:
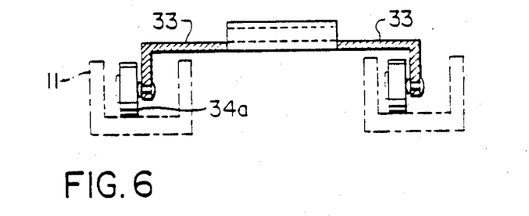
FIGS. 6 and 7 show the two forms of the track carrier mechanism.
Figure 7:
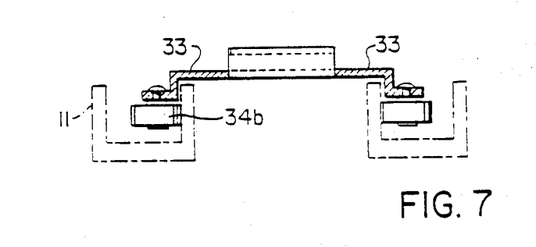

FIGS. 4, 5, 6 and 7 illustrate the design and construction of the caterpillar belt 17 and track carrier mechanisms 11 of FIG. 1 in more detail. The track belt on the inside is a flat surface with sprocket holes 32 into which special carriers 33 are mounted. The carriers are of two alternating kinds, the riding carrier with vertical bearings 34a as shown in FIG. 6 and the leading carrier with horizontal bearings 34b as shown in FIG. 7. The carriers are made of sheet steel and fit into the sprocket holes 32 also into which the teeth of the rear drive sprocket wheel 16 and front sprocket wheel 25 engage. The roller bearings 34a and 34b move in and along the sides of the track guides 11 provided in the main frame. The track belt proper 17 is made of reinforced rubber similar to a truck tire. It has raised sections that have half-cylinder cross-sectional shape and has teeth or studs 35 running across the width of the raised sections. These studded raised sections (see FIGS. 4 and 5 and also FIG. 1) are filled with polyurethane 36 foam and provide the riding surfaces on snow and land surfaces and also act as paddle wheel blades when in water.

Figure 8:
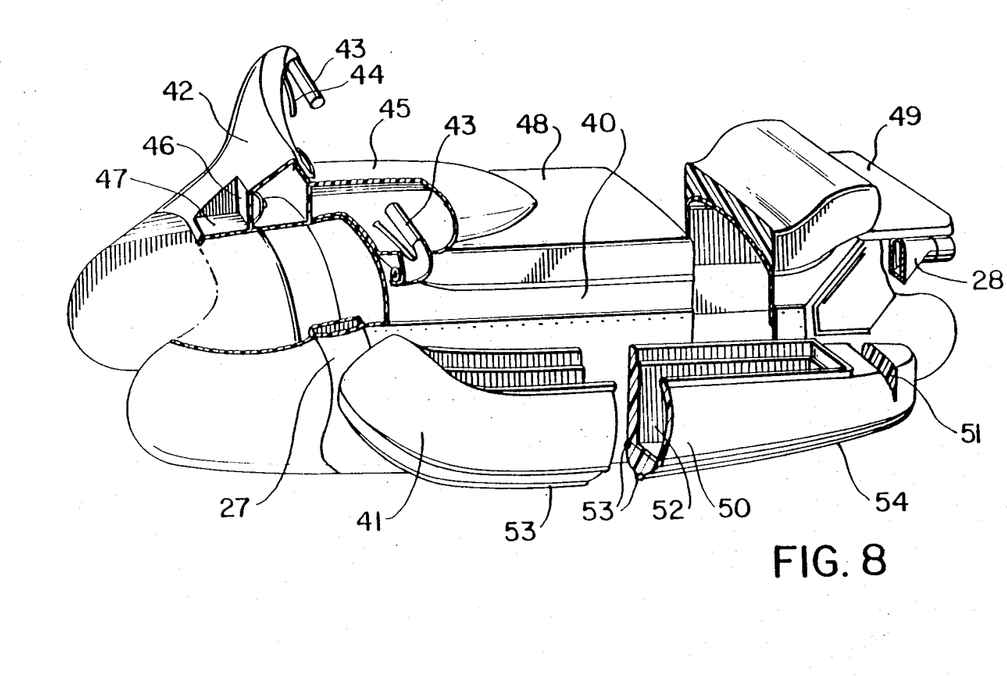
FIG. 8 is a side, partially broken view of the outer body and attached leg sliders.

FIG. 8 shows the outer body 40 and the leg sliders 41. The outer body is made of plastic material and has an elongated shape, the cross-section of which is in the form of a semi-circle throughout. It is affixed to the main frame of the vehicle along the top edge as well as to the hermetically tight air intake and exhaust canals 27 and 28 (of FIG. 1) to form an enclosed unified unit. The outer body's front portion 42 is also made of plastic material hermetically affixed and overlapping the main portion described above. It protects the front of the vehicle, the handlebars 43 with driving and brake controls 44, the necessary gauges, the ignitions, the air intake canal 27, the fuel tank 45, and the front lamp 46 in a suitable recess 47, all of which are firmly mounted on the outer body. On this front outer body section there are protected openings for the air intakes and openings for the accelerator and brake control cables such that these can pass to the main frame through the sides of which there are also openings into the engine and drive areas. The driver's seat 48 located behind the back of the fuel tank is made of covered vinyl. At the rear of the vehicle is a tool compartment 49 and accommodation for rear lights, a folding leg for propping the vehicle when stationary, a mud guard, and hook for pulling other vehicles or objects if desired.

The leg sliders 41 are mounted one on each side of the vehicle on the rocking arms 30 (see FIG. 1) by ball joints and serve as leg protectors as well as to facilitate steering of the vehicle and provide stability. The leg sliders are constructed of plastic material with double walls 50 filled with polyurethane foam 51 providing good stability and floatability. They are constructed in the shape of elongated containers providing space 52 for the driver's feet and are leg and foot operated. The foot 54 of the leg slider 41 is a replaceable, separate part screwed onto the main slider and is tightly filled with polyurethane foam. This foot is protected by the metal sliding rods 53 converging at both ends of the slider and forming one piece with the foot.

Figure 9:
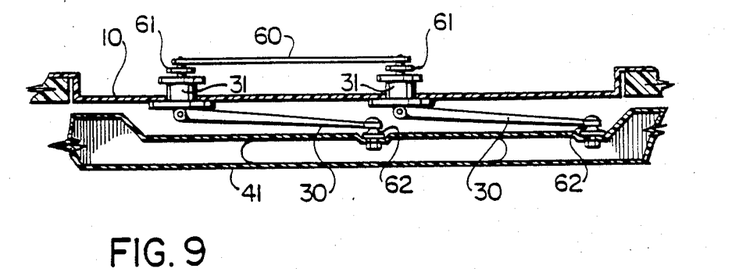
FIGS. 9, 10 and 11 show the control leg sliders and its form of attachment to the main frame.
Figure 10:
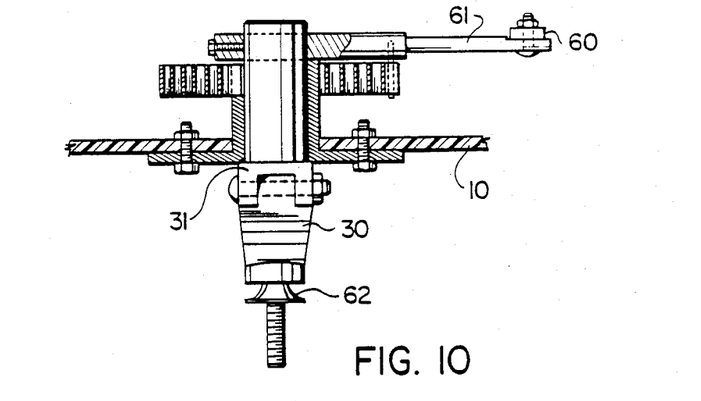
Figure 11:
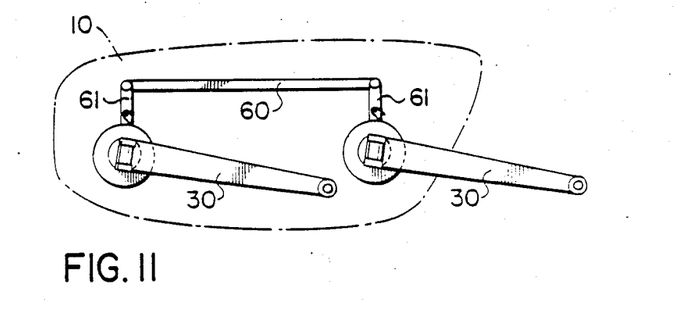

The construction of the rocking arms 30 is shown in more detail in FIGS. 9, 10 and 11. The slider 41 is connected via rocking arms 30 which in turn are rigidly mounted on the sides of the main frame 10. The rocking arms operate in unison by means of tie rods 60 connected to arms 61 inside the main frame. The bearing mountings 31 are spring loaded such that they hold the sliders in an upward retracted position except when operated by the feet of the vehicle driver. Special ball joints 62 are designed to allow the sliders to move in three directions, up, down and sideways but always remaining parallel to the main frame body.

Figure 12:
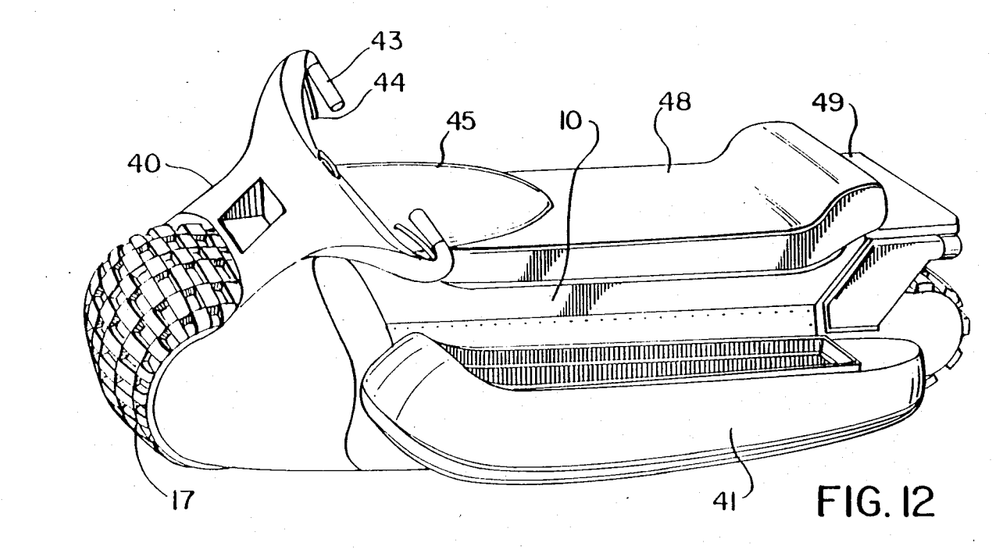
FIG. 12 is a side view of the vehicle in complete operating form.

FIG. 12 shows the vehicle in complete, ready-to-operate form. The outer riding body 40 is mounted on the main frame 10 which contains the engine and drive mechanisms driving the studded belt 17. To operate, the driver sits astride the vehicle on seat 48 with his feet in the designed foot openings in leg sliders 41 and his hands grasping handlebars 43 and engine and brake controls 44. The vehicle does not require a specific steering mechanism such as the front forks of a motor cycle or snowmobile because of the light weight of the vehicle, convex curved design of the main frame and the generally half cylindrical design of the track. On snow, ice, bare earth or hard surfaced roadways, only a small area of the track makes contact with the surfaces and therefore the vehicle acts somewhat like a single tire motor cycle with directional stability and turning operations achieved by the driver with his body. On the water the track acts as a paddle wheel giving propulsion and the leg sliders act as out-rigger pontoons giving stability and turning capability.

The leg sliders are very important for the best operation of the vehicle, adding to the comfort and stability of operation and their inclusion provide the preferred version of the machine. It can be operated however without the sliders with the driver using his feet or single foot supports for control and stability. It should be pointed out that the rotating sprocket and bogie wheels and the moving belt provide gyroscopic stability to the vehicle similar to that of motor cycles and bicycles.

In an alternate embodiment the rear portion of each slider 41 may be constructed as a separate part to the main body of the respective slider and connected thereto by a pivotal vertical hinge arrangement to permit transverse movement relative to said main body. Handlebars are provided on the vehicle and cables from the handlebars to the moveable parts of the sliders 41 facilitate controlled movement of said moveable parts from side to side. Thus the vehicle can be steered and small wheels can be built into the moveable parts of the sliders to improve the ride and steering of the vehicle on flat ground. As will be appreciated, the steering of the vehicle on water will also be improved.

It will thus be readily apparent to a person skilled in the art that a number of variations and modifications can be made without departing from the true spirit of the invention which will now be pointed out in the appended claims.

I claim:

1. An all weather, all terrain, amphibious tracked vehicle for riding and operation by one or a small number of persons comprising:
   (a) a main frame structure made of strong but light weight plastic or metal and having the general shape of an elongated enclosed box, the top surface of the structure being generally flat and the bottom surface in the lengthwise dimension having a convex shape,
   (b) two track guides parallel to each other built into or on and encircling the main frame in the lengthwise dimension adjacent the outer edges,
   (c) a continuous belt made of rubber or similar material and having a generally flat inner surface in which a series of belt carriers are fixed, the carriers having bearings adapted to travel in the two track guides such that the belt can run in guided fashion around the main frame in the lengthwise direction, said belt having an outer portion in the form of a continuous series of vane-like sections having a generally semi-circular cross-section with teeth or studs formed along the outer edge whereby a substantially small area of contact is achieved in use,
   (d) a driving sprocket wheel mounted transversely on an axle at the rear of and exterior to the main frame and positioned such that the teeth of the sprocket wheel engage openings in the said belt carriers,
   (e) a guiding sprocket wheel mounted transversely on an axle at the front of and exterior to the main frame and positioned such that the teeth of the sprocket wheel engage openings in the said belt carriers,
   (f) a power source, transmission, clutch and brake means mounted inside the main frame and adapted to drive the rear axle on which the driving sprocket wheel is mounted via water-tight shaft bearings,
   (g) an outer body made of plastic or metal rigidly mounted on the main frame over the upper portion of the caterpillar belt and incorporating fixed handlebars at the front, an operator's seat, and a fuel tank,
   (h) operating and control and fuel delivery means running from the outer body to the driving mechanisms in the main frame,
   (i) power source ventilating and cooling means inside the main frame and adapted to bring fresh air in and exhaust air out through ducts to the exterior, and
   (j) leg sliders in the form of elongated pontoon-like structures mounted on each side of the main frame on rocking arms attached to the main frame such that the leg sliders can move up, down, and sideways but always remaining parallel to the main frame and outer body, said sliders incorporating openings in their upper side for the feet of the vehicle operator.

2. An all weather, all terrain, amphibious tracked vehicle as in claim 1 wherein the leg sliders have a double-walled, light construction and have lengthwise metal or plastic bars fixed to their bottom surface such as to make smooth contact with the riding surface when necessary.

3. An all weather, all terrain, amphibious tracked vehicle as in claim 1, wherein the vane-like sections of the belt are filled with plastic foam to add flexibility, strength and reduce weight.

4. An all weather, all terrain, amphibious tracked vehicle as in claim 1 wherein the driving and guiding sprocket wheels are made of plastic with foam filled central portions to increase lightness.

5. An all weather, all terrain, amphibious, tracked vehicle for riding and operation by one or a small number of persons comprising:
   (a) a main frame structure made of strong but light weight plastic or metal and having the general shape of an elongated quadratic prism forming an enclosed light weight, water tight box, the top surface of the structure being flat and the bottom surface in the lengthwise dimension formed in the shape of the arc of a large radius circle,
   (b) two track guides parallel to each other built into or on and encircling the main frame adjacent the outer edges, said guides having a U-shaped cross-section,
   (c) a continuous rubber caterpillar belt having a flat inner surface in which a series of belt carriers are fixed, the carriers having roller bearings adapted to roll in the two track guides such that the track belt can run in guided fashion around the main frame in the lengthwise direction, said belt having an outer portion in the form of a continuous series of vane-like sections having a generally semi-circular cross-section with teeth or studs formed along the outer edge,
   (d) a driving sprocket wheel mounted transversely on an axle at the rear of and exterior to the main frame and positioned such that the teeth of the sprocket wheel engage openings in the said belt carriers,
   (e) a guiding sprocket wheel mounted transversely on an axle at the front of and exterior to the main frame and positioned such that the teeth of the sprocket wheel engage openings in the said belt carriers,
   (f) an internal combustion engine mounted inside the main frame and adapted to drive the driving sprocket wheel via transmission clutch, and brake means, (g) an outer body made of plastic having a generally elongated, semi-circular cross-section shape rigidly mounted on the main frame over the upper portion of the caterpillar belt and incorporating fixed handlebars at the front, an operator's cushion seat, and a fuel tank, (h) leg sliders in the form of elongated pontoon-like structures mounted on each side of the main frame on rocking arms mounted in bearings on the main frame such that the leg sliders can move up, down, and sideways but always remaining parallel to the main frame and outer body, said leg sliders having a double-walled, light construction and incorporating openings in their upper side for the feet of the vehicle operator, (i) engine operating control and fuel delivery means running from the outer body to the engine mechanisms in the main frame, and (j) engine ventilating and cooling means inside the main frame and adapted to bring fresh air in and exhaust air out through ducts to the exterior.

6. An all weather, all terrain, amphibious tracked vehicle for riding and operation by one or a small number of persons comprising:

(a) a main frame structure made of strong but light weight plastic or metal and having the general shape of an elongated enclosed box, the top surface of the structure being generally flat and the bottom surface in the lengthwise dimension having a convex shape, (b) two track guides parallel to each other built into or on and encircling the main frame in the lengthwise dimension adjacent the outer edges, (c) a continuous rubber belt having a generally flat inner surface in which a series of belt carriers are fixed, the carriers having bearings adapted to travel in the two track guides such that the belt can run in guided fashion around the main frame in the lengthwise direction, said belt having an outer portion in the form of a continuous series of vane-like sections having a generally semi-circular cross-section with teeth or studs formed along the outer edge, (d) a driving sprocket wheel mounted transversely on an axle at the rear of and exterior to the main frame and positioned such that the teeth of the sprocket wheel engage openings in the said belt carriers, (e) a guiding sprocket wheel mounted transversely on an axle at the front of and exterior to the main frame and positioned such that the teeth of the sprocket wheel engage openings in the said belt carriers, (f) a power source, transmission, clutch and brake means mounted inside the main frame and adapted to drive the rear axle on which the driving sprocket wheel is mounted via water-tight shaft bearings, (g) an outer body made of plastic or metal rigidly mounted on the main frame over the upper portion of the caterpillar belt and incorporating fixed handlebars at the front, an operator's seat, and a fuel tank, (h) operating and control and fuel delivery means running from the outer body to the driving mechanisms in the main frame, (i) power source ventilating and cooling means inside the main frame and adapted to bring fresh air in and exhaust air out through ducts to the exterior, (j) leg sliders in the form of elongated pontoon-like structures mounted on each side of the main frame on rocking arms attached to the main frame such that the leg sliders can move up, down, and sideways but always remaining parallel to the main frame and outer body, said slides incorporating openings in their upper side for the feet of the vehicle operator and wherein the rear part of each slider is movable transversely of the main body of the respective slider under the control of cables from handlebars provided on the vehicle, wheels being provided for each rear part to facilitate operation over ground.

7. An all weather, all terrain, amphibious tracked vehicle for riding and operation by one or a small number of persons comprising:

(a) a main frame structure made of strong but light weight plastic or metal and having the general shape of an elongated enclosed box, the top surface of the structure being generally flat and the bottom surface in the lengthwise dimension having a convex shape, (b) two track guides parallel to each other built into or on and encircling the main frame in the lengthwise dimension adjacent the outer edges, (c) a continuous rubber belt having a generally flat inner surface in which a series of belt carriers are fixed, the carriers having bearings adapted to travel in the two track guides such that the belt can run in guided fashion around the main frame in the lengthwise direction, said belt having an outer portion in the form of a continuous series of vane-like sections having a generally semi-circular cross-section with teeth or studs formed along the outer edge, (d) a driving sprocket wheel mounted transversely on an axle at the rear of and exterior to the main frame and positioned such that the teeth of the sprocket wheel engage openings in the said belt carriers, (e) a guiding sprocket wheel mounted transversely on an axle at the front of and exterior to the main frame and positioned such that the teeth of the sprocket wheel engage openings in the said belt carriers, (f) a power source, transmission, clutch and brake means mounted inside the main frame and adapted to drive the rear axle on which the driving sprocket wheel is mounted via water-tight shaft bearings, (g) an outer body made of plastic or metal rigidly mounted on the main frame over the upper portion of the caterpillar belt and incorporating fixed handlebars at the front, an operator's seat, and a fuel tank, (h) operating and control and fuel delivery means running from the outer body to the driving mechanisms in the main frame, (i) power source ventilating and cooling means inside the main frame and adapted to bring fresh air in and exhaust air out through ducts to the exterior, (j) leg sliders in the form of elongated pontoon-like structures mounted on each side of the main frame on rocking arms attached to the main frame such that the leg sliders can move up, down, and sideways but always remaining parallel to the main frame and outer body, said sliders incorporating openings in their upper side for the feet of the vehicle operator, wherein the leg sliders have a double-walled, light construction and have lengthwise metal or plastic bars fixed to their bottom surface such as to make smooth contact with the riding surface when necessary, and wherein the rear part of each slider is movable transversely of the main body of the respective slider under the control of cables from handlebars provided on the vehicle, wheels being provided for each rear part to facilitate operation over ground.

* * * * *